United States Patent [19]

Dreckmann

[11] Patent Number: 4,552,551

[45] Date of Patent: Nov. 12, 1985

[54] DOUBLE- AND BOTTOM-SEAM BAG-MAKING METHOD AND APPARATUS

[75] Inventor: Karl Dreckmann, Hennef-Altenbödingen, Fed. Rep. of Germany

[73] Assignee: M. Lehmacher & Sohn GmbH Maschinenfabrik, Niederkassel-Mondorf, Fed. Rep. of Germany

[21] Appl. No.: 455,919

[22] Filed: Jan. 6, 1983

[30] Foreign Application Priority Data

Jan. 16, 1982 [DE] Fed. Rep. of Germany ....... 3201248

[51] Int. Cl.[4] ............................................. B31B 23/00
[52] U.S. Cl. .................................... 493/194; 156/251; 156/510; 156/515; 493/203; 493/204
[58] Field of Search ............... 156/250, 251, 510, 515, 156/518, 530; 493/199, 203, 204, 206, 207, 209, 194, 198

[56] References Cited

U.S. PATENT DOCUMENTS

| | | |
|---|---|---|
| 3,257,256 | 6/1966 | Lehmacher et al. ................. 156/515 |
| 3,384,528 | 5/1968 | Lehmacher et al. ................. 156/515 |
| 4,019,947 | 4/1977 | Stock et al. ......................... 156/515 |
| 4,268,346 | 5/1981 | Achelpohl ........................... 156/510 |

FOREIGN PATENT DOCUMENTS

| | | |
|---|---|---|
| 1479412 | 4/1969 | Fed. Rep. of Germany ...... 156/515 |
| 2418233 | 11/1975 | Fed. Rep. of Germany ...... 493/203 |

*Primary Examiner*—Caleb Weston
*Attorney, Agent, or Firm*—Karl F. Ross; Herbert Dubno

[57] ABSTRACT

An apparatus for making bags from a multilayer synthetic-resin strip workpiece has a vertically displaceable upper welding element which has an upper upstream welding tool extending across the strip and an upper downstream welding tool generally parallel thereto, and a blade fitted in the tool element to project downward from the upper tools. Respective heatable and vertically displaceable lower upstream and downstream welding tools are vertically aligned with the upper upstream and downstream tools and a bottom-seaming blade is displaceable between the lower tools between a position beneath same to a position projecting above same and operates for double seaming by positioning a stacker pin and the bottom blade below the lower tools and heating the respective tools which are displaced from the outer to the inner positions with the workpiece between them to pinch and weld the workpiece together along upstream and downstream seams at the respective tools and to cut the workpiece across with the upper blade between the seams, and for bottom seaming by removing the blade and raising the pin and bottom blade above the lower tools, which are displaced from the outer to the inner positions with the workpiece between them to simultaneously cut the workpiece through and form two confronting end seams with the bottom blade while pinching it on both sides of the blade and spindling it downstream of the blade on the pin.

4 Claims, 5 Drawing Figures

DOUBLE- AND BOTTOM-SEAM BAG-MAKING METHOD AND APPARATUS

FIELD OF THE INVENTION

The present invention relates to a manufacture of a bag from a multilayer thermoplastic workpiece. More particularly this invention concerns an apparatus and method for making bags from an elongated tube or the like.

BACKGROUND OF THE INVENTION

It is known from German Pat. No. 1,182,414 to make bags from a multilayer thermoplastic strip workpiece, normally of polyethylene, in an apparatus having transport means for conveying the workpiece longitudinally in a transport direction along a path underneath an upper welding element having relative to the direction an upper upstream welding tool extending across the path and generally parallel thereto an upper downstream welding tool. Respective lower upstream and downstream welding tools are vertically aligned with the upper upstream and downstream tools and a blade extends transverse to the path between one of the upstream tools and the respective downstream tool. The upper and lower tools with the workpiece between them are relatively displaced toward one another to weld the workpiece together along upstream and downstream seams at the respective tools and to cut the workpiece across with the blade between the seams, and away from one another to free the severed downstream end section of the workpiece. Stacking means including a stack support downstream of the tools catches and holds the severed end sections in a stack.

Such an arrangement cannot normally conveniently be used other than double-seam operation, that is forming a pair of separate seams that are separated by the cut formed by the blade. In some situations it is preferable to form so-called bottom or end seams that extend wholly to the severed ends. This can be done in the above-described machine only by heating the blade and turning up the heat on the tools to form wide end seams. The result is a wide seam that wastes material and looks unattractive, while not being stronger than a preferred narrow bottom seam which can only be produced on a special-duty machine.

Stacking must normally be carried out downstream of the system, at least for double seaming. This further complicates use of the above-described machine for anything but a single use, since the differently seamed workpieces must be handled differently.

OBJECTS OF THE INVENTION

It is therefore an object of the present invention to provide a convertible double- and bottom-seam bag-making method and apparatus.

Another object is the provision of such a double- and bottom-seam bag-making method and apparatus which overcome the above-given disadvantages.

More particularly, the system of the instant invention must convert from the one style of operation to the other and operate efficiently in both manners.

SUMMARY OF THE INVENTION

These objects are attained according to the instant invention in an apparatus for making bags from a multilayer synthetic-resin strip workpiece which has transport means for conveying the workpiece longitudinally in a transport direction along a path. An upper welding element along the path has an upper upstream welding tool extending across the path, an upper downstream welding tool generally parallel thereto, and a seat extending parallel to and between the two upper tools. A blade can be fitted in the seat of the tool element to project downward from the upper tools when in the seat. Respective lower upstream and downstream welding tools are vertically aligned with the upper upstream and downstream tools and means is provided for heating at least one of the upstream tools and at least one of the downstream tool. Stacking means is provided including at least one pin movable in the lower downstream tool between a position beneath same to a position projecting above same. Bottom-seaming means includes a bar displaceable between the lower tools between a position beneath same to a position projecting above same. Drive means can vertically displace the upper and lower tools from outer positions toward one another to closely juxtaposed inner positions. The machine operates for double seaming by fitting the blade in the seat, positioning the pin and bar below the lower tools and heating the respective tools with the heating means. With the machine thus set the tools are displaced from the outer to the inner positions with the workpiece between them to pinch and weld the workpiece together along upstream and downstream seams at the respective tools and to cut the workpiece across with the blade between the seams. The machine operates for bottom seaming by removing the blade from the seat and raising the pin and bar above the lower tools. When thus set the tools are displaced from the outer to the inner positions with the workpiece between them to simultaneously cut the workpiece through and form two confronting end seams with the bar while pinching it to both sides of the bar and spindling it downstream of the bar on the pin.

Thus it is possible to convert the machine rapidly and simply from double-seaming to bottom-seaming operation. Stacking can be performed right in the machine for bottom seaming.

According to another feature of this invention, during double seaming downward displacement of the upstream lower tool from the inner position is resisted with a relatively great spring force and downward displacement of the downstream lower tool relative to the upstream lower tool is resisted with a relatively small spring force. This can be done by supporting the downstream lower tool by a relatively soft spring on the upstream loer tool and by supporting same during double seaming by means of a stiff spring pack on the machine frame.

The transport means according to this invention includes at least one nozzle forming a horizontal stream of air defining the path. The bottom-seaming bar is positioned for bottom seaming to block the stream in its upper position above the lower tools. To this end during bottom seaming the upper and lower tools are moved together and apart, as compared to operation during double seaming when the lower tools are held generally stationary.

For bottom seaming the bar is heated, and thus forms a neat small seam at the ends thus formed. The product waste inherent in the wide seam according to the prior art is avoided.

DESCRIPTION OF THE DRAWING

The above and other features and advantages will become more readily apparent from the following, reference being made to the accompanying drawing in which.

SPECIFIC DESCRIPTION

Figure 1:
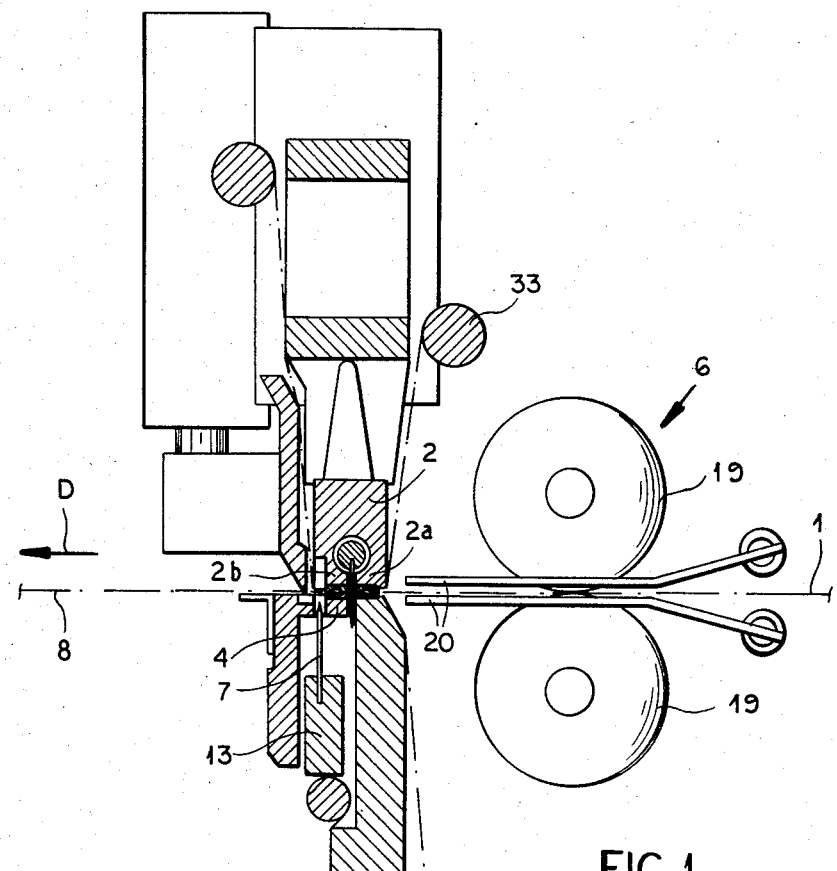
FIG. 1 is a vertical and partly diagrammatic section illustrating the apparatus according to this invention set up for double seaming.
Figure 4:
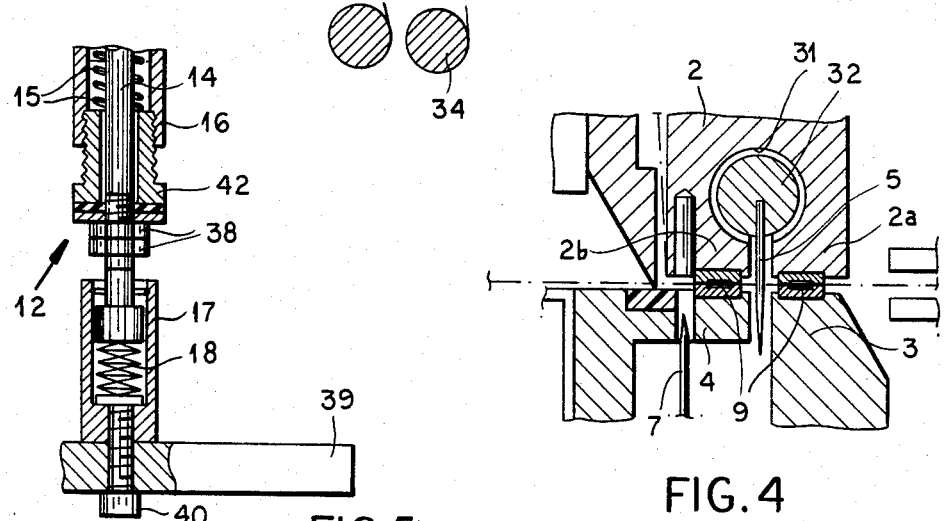
FIG. 4 is a large-scale view of a detail of FIG. 1.

An apparatus according to this invention as seen in the drawing serves to transversely weld and longitudinally subdivide a workpiece 1, here a double layer of a thermoplastic foil, film, or sheet intended for the manufacture of bags. To this end the workpiece 1 is a polyethylene tube that is made into bags by forming a transverse bottom seam across and then severing it transversely to longitudinally subdivide it into individual bags with the transverse seam being the bottom of the bag. This operation can be carried out in two manners, either by simultaneously seaming and cutting along three parallel lines with the two seams flanking the cut, a procedure known as double seaming, or by melting through the tube along a line to form two closed and parallel straight end seams, a procedure known as bottom seaming. FIGS. 1 and 4 shows the apparatus set up for double seaming.

The apparatus has an upper welding element 2 formed with a transversely throughgoing upstream tool 2a and with a similar downstream tool 2b. Between the tools 2a and 2b the element 2 is formed as better seen in FIG. 2 with a throughgoing bore 31 that receives a rod 32 fitted with a blade 5 that projects down between and beneath the lower faces of the tools 2a and 2b. A drive 33 is connected to the element 2 to jointly raise and lower the integral tools 2a and 2b.

Underneath the upper tools 2a and 2b the apparatus is provided with independent upstream and downstream lower tools or anvils 3 and 4 provided, like the upper tools 2a and 2b, with strip heaters 9 that allow their faces to be heated. These anvils 3 and 4 can be vertically reciprocated by a drive 34.

The workpiece 1 is fed through the machine in a transport direction D by a feeder 6 comprising a pair of oppositely rotated pinch rollers 19 and a pair of slot nozzles 20 that are directed horizontally downstream above and below the workpiece 1. Thus the wide band-shaped streams of air flowing downstream from these nozzles 20 hold the workpiece 1 in a planar and perfectly horizontal position so that it is possible to orient a downstream section 8 of the workpiece 1 to extend through the space between the upper welding element 2 and lower tools 3 and 4.

Downstream of the welding station formed by the element 2 and tools 3 and 4 is at least one stacking pin 7 on which can be spindled a stack 11 (FIG. 2) of severed-off end sections or bags 8 that are delivered to a conveyor as described in my copending and jointly filed patent application Ser. No. 455,904 now U.S. Pat. No. 4,512,757 to which reference should be made for specifics. This pin 7 projects up from a bar 13 whose function is described below. For double seaming it lies wholly below the horizontal plane defined by the upper faces of the tools 3 and 4.

Figure 5:
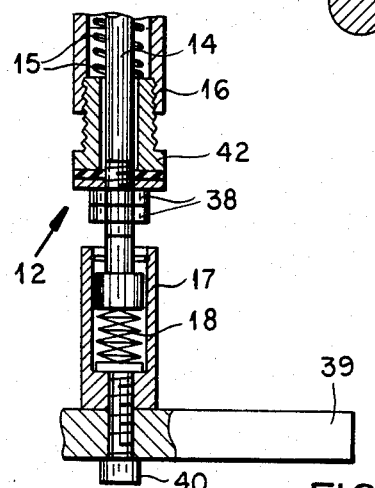
FIG. 5 is a large-scale view of another detail of the apparatus of this invention.
Figure 2:
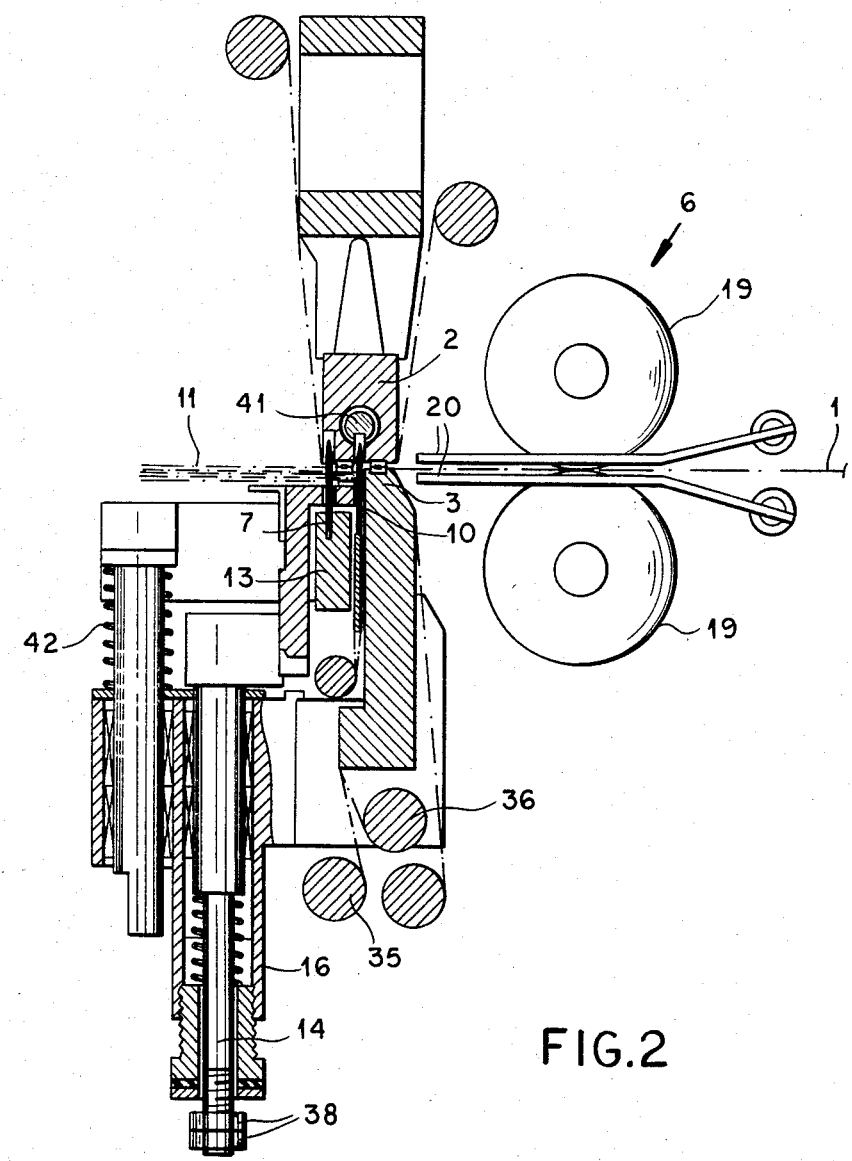
FIG. 2 is a view like that of FIG. 1 but showing the apparatus set up for bottom seaming.
Figure 3:
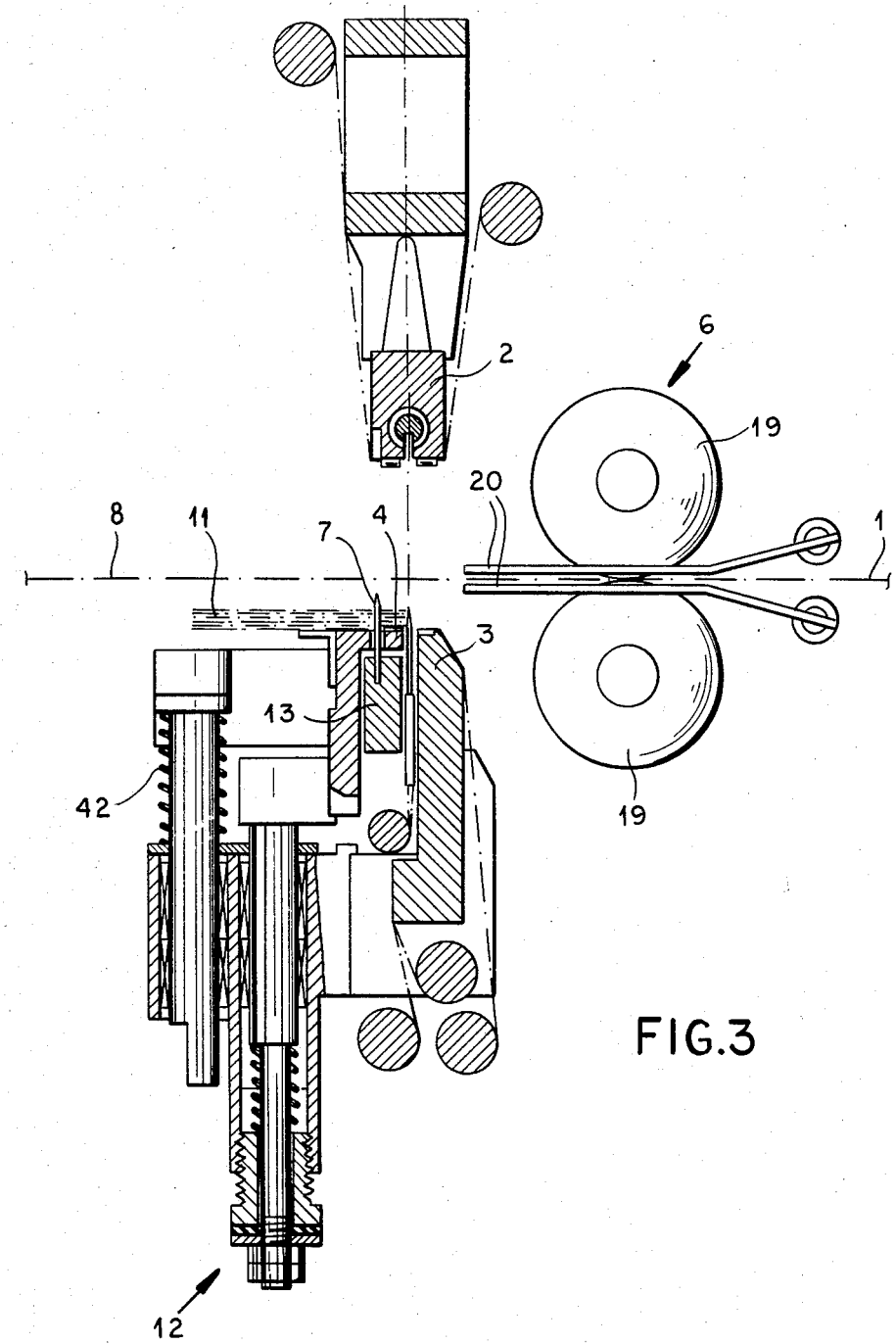
FIG. 3 is another view similar to FIG. 2 but showing the apparatus set up as in FIG. 2 but in another operational position.

The tool 4 is carried as shown in FIGS. 2 and 5 on a plurality of like rods 14 each surrounded by a tube 16 that supports the tool 3, with springs 15 braced between each rod 14 and tube 16 to urge the tool 4 into a position horizontally level with the tool 3. An adjustment nut 42 screwed into the lower end of the tube 16 supporting the tool 3 establishes the force exerted upward by the spring 15 on the tool 4. Lock nuts 38 define the relative position of the tools 3 and 4 relative to each other when the tool 4 is in its uppermost position as shown in FIGS. 1, 3, and 4. For double-seam welding a spring pack 18 is mounted in a cup 17 underneath the lower end of the rod 14 to resist downward displacement of both the tools 3 and 4 with a substantial force. This cup 17 is releasably secured in place on the frame 39 of the device by means of a screw 40.

Thus, for double-seam bag production the heaters 9 are all energized, although only one of the upstream and one of the downstream heaters 9 need be used for very thin film, and the spring abutment unit formed by the cup 17 and springs 18 is positioned under the rod 14. This inhibits the tool 4 from moving down relative to the tool 3, allowing them both only to move limitedly down against considerable spring force.

The downstream end section 8 of the workpiece 1 is positioned by the air blasts from the nozzles 20 to extend horizontally downstream through the gap defined between the upper element 2 and lower tools 3 and 4 in the starting position, in which they are vertically spaced. The upper welding element 2 is then brought down to simultaneously pinch and weld together the workpiece 1 along two parallel lines while the blade 5 severs the downstream section 8 with its newly formed upstream end seam from the workpiece 1.

The upper tool 2 is then lifted so that the freed downstream section 8 moves back in the direction D. Hence it can be stacked up as shown in the above-cited German patent or in my copending patent application Ser. No. 455,904 to now U.S. Pat. No. 4,512,757 to which reference should be made for specifics.

As seen in FIGS. 2 and 3, for bottom-seam operation the device is provided with a heatable rail or blade 10 that can be raised by a drive 36 to a position projecting up between and above the upper faces of the two lower tools or anvils 3 and 4. This is possible when the blade 5 and its bar 32 have been removed from the hole 31 and replaced with a simple slotted rod 41. In addition the holding pin or pins 7 carried on a bar 13 can be raised by means of a drive 35 to project up through the downstream anvil 4. This bar 13 is supported by springs 42 like the springs 15. The spring arrangement 17, 18 shown in FIG. 5 is not used for bottom seaming so the downstream tool 4 can sink against the force of the spring 15 relative to the upstream tool 3.

The heaters 9 are not used for bottom seaming; instead the workpiece is pinched between the tools 2a and 3 along a line, is melted through along a line immediately downstream therefrom by the bar 10, and is pinched downstream of the melt line between the upper downstream tool 2b and the tool 4 or the stack 11 of severed sections held against it. Downward displacement of the element 4 relative to the tool 2 is possible because the spring pack 18 and its cup 17 are not underneath the rod 14 carrying the tool 4. As the tool 4 moves down the bar 10 acts as a shield to prevent the air stream from the lower nozzle 20 from moving the stacked workpiece 8. The stack 11 thus formed is left spindled on the needle 7a.

A comparison of FIGS. 2 and 3 also shows that the upper tools 2a and 2b move down for the bottom-seaming operation while the lower tools 3 and 4 move up to a central position. This holds the stack 11 largely out of the way of the air blasts from the nozzles 20, shielded behind the bar 10.

Thus the system of the present invention can be used for double seaming and bottom seaming. Changeover from the one style of operation to the other is simple and quick and in both modes the machine operates as well as standard single-duty machines.

I claim:

1. An apparatus for making bags from a multilayer synthetic-resin strip workpiece, the apparatus comprising:
    transport means for conveying the workpiece longitudinally in a transport direction along a path;
    an upper welding element along the path having
        an upper upstream welding tool extending across the path,
        an upper downstream welding tool generally parallel thereto, and
        a seat extending parallel to and between the two upper tools in said upper welding element;
    a first blade releasably fittable in the seat of the upper welding element and projecting downward from the upper tools when in the seat;
    respective lower upstream and downstream welding tools vertically aligned with the upper upstream and downstream tools;
    means for heating at least one of the upstream tools and at least one of the downstream tools;
    stacking means including at least one pin movable in the lower downstream tool between a position beneath same to a position projecting above same;
    bottom-seaming means including a further blade positionable between the lower tools and displaceable between a position beneath same into a position projecting above said lower tools into said seat upon the removal of the first blade therefrom;
    means for vertically displacing the upper and lower tools with the workpiece between them from outer positions toward one another to closely juxtaposed inner positions to weld the workpiece together along upstream and downstream seams at the respective tools and to cut the workpiece across with the first blade between the seams when heater means is heating the respective tools, the blade is in the seat, and the pin lies below the lower tools for double seaming and to cut through and form end seams in the workpiece with said second blade when the heater means is not heating the respective tools, the blade is not in the seat, and the pin is above the lower tools for bottom seaming, and for displacing said tools away from one another to free the severed downstream end section of the workpiece;
    relatively stiff spring means nondisplaceable transversely of the path and engageable with the upstream lower tool for resisting downward displacement of same from the inner position with a relatively great spring force; and
    relatively soft spring means supporting the downstream lower tool on the upstream lower tool for resisting downward displacement of the former relative to the latter with a relatively small spring force.

2. The bag-making apparatus defined in claim 1 wherein the transport means includes at least one nozzle forming a horizontal stream of air defining the path, the bottom-seaming bar being positionable to block the stream in its upper position above the lower tools.

3. A method for making bags from a multilayer synthetic-resin strip workpiece comprising the steps of:
    double seaming by
    (a) fitting a first blade in a seat formed in an upper welding element and extending downwardly therefrom between respective upper upstream and downstream welding tools extending across the width of said strip and lying parallel to one another;
    (b) positioning a pin and a second blade below a lower welding element formed by respective lower upstream and downstream welding tools extending across the width of said strip and lying parallel to one another and in vertical alignment with said respective upper welding tools;
    (c) heating the respective welding tools with heating means;
    (d) displacing the upper and lower welding elements from outer positions thereof to inner positions thereof with the workpiece between them to pinch and weld the workpiece together along upstream and downstream seams at the respective welding tools and to cut the workpiece across with said first blade between the seams; and
    bottom seaming by
    (e) removing said first blade from said seat;
    (f) raising said pin and said second blade above said lower welding element; and
    (g) displacing said upper and lower welding elements from the outer to the inner positions thereof with the workpiece between them to simultaneously cut the workpiece through and form two confronting end seams with the second blade while pinching the workpiece on both sides of the second blade and spindling the workpiece downstream of the second blade on said pin, wherein downward displacement of the lower upstream welding tool from the inner position thereof is resisted with a relatively great spring force and downward displacement of the lower downstream welding tool relative to the lower upstream welding tool is resisted with a relatively small spring force.

4. The bag-making method defined in claim 3 wherein the second blade is heated for bottom seaming.

* * * * *